United States Patent
Schaffer et al.

(10) Patent No.: US 7,454,775 B1
(45) Date of Patent: *Nov. 18, 2008

(54) METHOD AND APPARATUS FOR GENERATING TELEVISION PROGRAM RECOMMENDATIONS BASED ON SIMILARITY METRIC

(75) Inventors: J. David Schaffer, Wappingers Falls, NY (US); Larry J. Eshelman, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 992 days.

This patent is subject to a terminal disclaimer.

(21) Appl. No.: 09/627,140

(22) Filed: Jul. 27, 2000

(51) Int. Cl.
*H04N 5/445* (2006.01)

(52) U.S. Cl. ...................................... 725/46

(58) Field of Classification Search ................... 725/44, 725/45, 46, 35
See application file for complete search history.

(56) References Cited

U.S. PATENT DOCUMENTS

| | | | |
|---|---|---|---|
| 5,296,931 A | | 3/1994 | Na .............................. 348/731 |
| 5,410,344 A | * | 4/1995 | Graves et al. ................. 725/46 |
| 5,585,865 A | | 12/1996 | Amanao et al. ............. 348/731 |
| 5,758,259 A | * | 5/1998 | Lawler ......................... 725/45 |
| 5,790,935 A | * | 8/1998 | Payton ......................... 725/91 |
| 5,867,226 A | * | 2/1999 | Wehmeyer et al. ............ 725/46 |
| 6,005,597 A | * | 12/1999 | Barrett et al. ................. 725/46 |
| 6,088,722 A | * | 7/2000 | Herz et al. ................... 709/217 |
| 6,133,909 A | * | 10/2000 | Schein et al. ............... 345/721 |
| 6,704,931 B1 | * | 3/2004 | Schaffer et al. ............... 725/46 |
| 6,973,663 B1 | * | 12/2005 | Brown et al. ................. 725/39 |

FOREIGN PATENT DOCUMENTS

EP 0854645 A2 7/1998
EP 854645 A2 * 7/1998

* cited by examiner

*Primary Examiner*—Chris Kelley
*Assistant Examiner*—James Sheleheda

(57) ABSTRACT

The invention recommends television programs that are similar to shows identified by a user by computing a similarity metric between programs both in a user-specified selected set and in an identified time interval. The selected set comprises programs currently of interest to the user, for allowing the user or viewer to easily select one or more programs of interest. The similarity metric is a sum of weighted scores for each matching attribute between programs in the selected set and programs in the identified time interval. Shows that are actually selected for viewing are observed and the weightings, $w_i$, assigned to each matching program attribute are adjusted, so that over time, the similarity metric, $S_M$, more accurately reflects the viewer's idea of "similar shows."

20 Claims, 4 Drawing Sheets

PROGRAM DATABASE - 200

| | DATE/TIME 240 | CHANNEL 245 | TITLE 250 | GENRE 255 | | SIMILARITY METRIC 270 |
|---|---|---|---|---|---|---|
| 205 | 11/18/99 -- 8:00 P.M. | CH 1 | LUCY | COMEDY | | 55 |
| 210 | 11/18/99 -- 8:30 P.M. | CH 1 | AL'S FAMILY | SITCOM | | 78 |
| 220 | 11/18/99 -- 9:00 P.M. | CH 3 | YOUR HOUSE | DRAMA | | 96 |

FIG. 2

ELECTRONIC PROGRAM GUIDE -- 400

EPG FOR THURSDAY, NOV. 18, 1999 FROM 8 P.M. UNTIL 11 P.M.

|       | 8:00 | 8:30 | 9:00 | 9:30 | 10:00 | 10:30 |
|-------|------|------|------|------|-------|-------|
| CH 1  | LUCY <similarity metric=55> | AL'S FAMILY <similarity metric = 78> | | STAR VOYAGER <similarity metric=23> | CH 1 NEWS <similarity metric=62> | |
| CH 2  | BASEBALL TODAY <similarity metric=23> | | INSIDE SPORTS <similarity metric=14> | | HOCKEY <similarity metric=10> | |
| CH 3  | TONIGHT <similarity metric=52> | FAMILY TIME <similarity metric=30> | YOUR HOUSE <similarity metric=96> | EVENING NEWS <similarity metric=69> | HOSPITAL DRAMA <similarity metric=88> | |
| ...   | | | | | | |
| CH 99 | WORLD NEWS <similarity metric=70> | | LOCAL NEWS <similarity metric=60> | | NEWSSTAND <similarity metric=65> | |

FIG. 4

METHOD AND APPARATUS FOR GENERATING TELEVISION PROGRAM RECOMMENDATIONS BASED ON SIMILARITY METRIC

FIELD OF THE INVENTION

The present invention relates to television program recommenders, and more particularly, to a method and apparatus for recommending television programs that are similar to one or more identified shows.

BACKGROUND OF THE INVENTION

As the number of channels available to television viewers has increased, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, it has become increasingly difficult to effectively identify desirable television programs using such printed guides.

More recently, television program guides have become available in an electronic format, often referred to as electronic program guides (EPGs). Like printed television program guides, EPGs contain grids listing the available television programs by time and date, channel and title. Some EPGs, however, allow television viewers to sort or search the available television programs in accordance with personalized preferences. In addition, EPGs allow for on-screen presentation of the available television programs.

While EPGs allow viewers to identify desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs or sports programming. Thus, the viewer preferences can be applied to the EPG to obtain a set of recommended programs that may be of interest to a particular viewer.

Thus, a number of tools have been proposed or suggested for recommending television programming. The Tivo™ system, for example, commercially available from Tivo, Inc., of Sunnyvale, Calif., allows viewers to rate shows using a "Thumbs Up and Thumbs Down" feature and thereby indicate programs that the viewer likes and dislikes, respectively. In this manner, the Tivo™ system implicitly derives the viewer's preferences from previous television programs that the viewer liked or did not like. Thereafter, the TiVo receiver matches the recorded viewer preferences with received program data, such as an EPG, to make recommendations tailored to each viewer.

In addition, U.S. patent application Ser. No. 09/519,550, filed Mar. 6, 2000, entitled "Method and Apparatus for Displaying Television Program Recommendations," displays a list of available programs together with an indication of the recommendation score assigned to each program by a television programming recommender. In one implementation, the numerical scores can be mapped onto a color spectrum or another visual cue, such as size-of-text or rate of blinking, that permits the user to quickly locate programs of interest.

Thus, such tools for recommending television programming provide selections of programs that a viewer might like. Even with the aid of such program recommenders, however, it is still difficult for a viewer to identify programs of interest from among all the options. A need therefore exists for a method and apparatus for recommending television programs that are similar to one or more identified shows. A further need exists for a method and apparatus for generating television program recommendations that is responsive to the current mood of the viewer.

SUMMARY OF THE INVENTION

Generally, a method and apparatus are disclosed for generating television program recommendations based on a similarity metric. In particular, the present invention recommends television programs that are similar to one or more identified shows. The programs and corresponding recommendation information can be presented to the viewer, for example, using grids listing the available television programs by time and date, channel and title.

The present invention generates television program recommendations based on a similarity metric computed between each program in a user-specified selected set and each program in an identified time interval. The selected set comprises one or more programs currently of interest to the user. Thus, the present invention provides an electronic programming guide that allows a viewer to easily select one or more programs that the viewer currently finds attractive.

In one illustrative embodiment, the similarity metric is a sum of weighted scores for each matching attribute between programs in the selected set and programs in the identified time interval. If the selected set contains more than one program, an average score can be utilized, or the maximum value to any program in the selected set. Program attributes may include, for example, the date, time, channel, title, program description and genre associated with a given program.

The disclosed invention includes a feedback feature that observes similar programs that are actually selected for viewing and increments the corresponding weights, $w_i$, assigned to each program attribute, so that over time, the similarity metric, $S_M$, more accurately reflects the viewer's idea of "similar shows."

A more complete understanding of the present invention, as well as further features and advantages of the present invention, will be obtained by reference to the following detailed description and drawings.

BRIEF DESCRIPTION OF THE DRAWINGS

FIG. 2 illustrates a sample table from the program database of FIG. 1;

FIG. 4 is a sample table from the electronic program guide incorporating features of the present invention.

DETAILED DESCRIPTION

Figure 1:
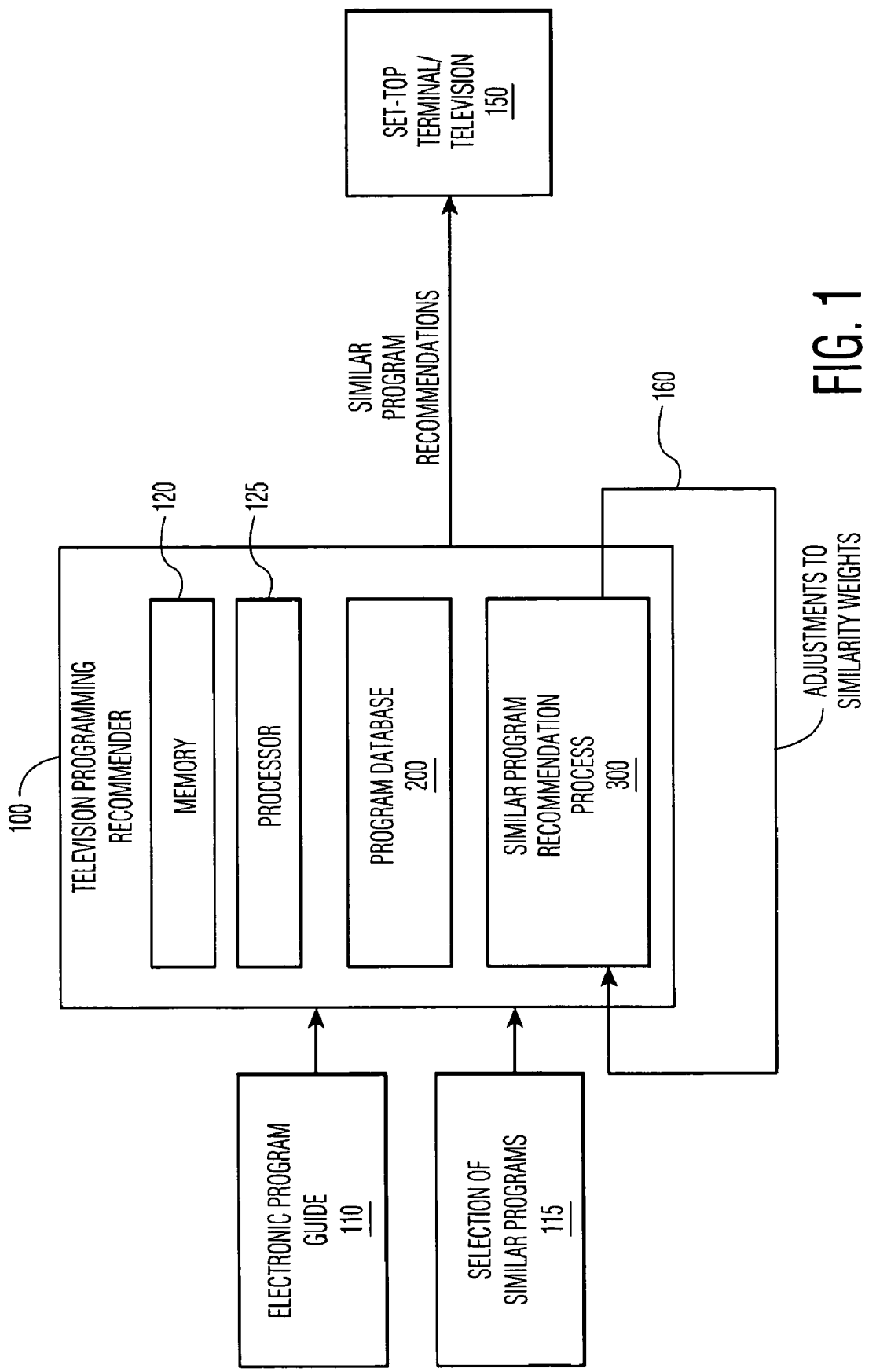
FIG. 1 illustrates a television programming recommender in accordance with the present invention.

FIG. 1 illustrates a television programming recommender 100 in accordance with the present invention. As shown in FIG. 1, the television programming recommender 100 evaluates each of the programs in an electronic programming guide (EPG) 110 to identify programs of interest to a particular viewer. The set of recommended programs can be presented to the viewer using a set-top terminal/television 150, for example, using well-known on-screen presentation techniques.

According to one feature of the present invention, the television programming recommender 100 generates television program recommendations based on a similarity metric. In particular, the present invention recommends television programs that are similar to one or more identified programs 115. In this manner, an electronic programming guide is provided that allows a viewer to select one or more programs that the viewer currently finds attractive.

As discussed further below in conjunction with FIG. 3, a similarity metric is computed between each program in the selected set and each program in an identified time interval. In one illustrative embodiment, the similarity metric is a sum of weighted scores for each matching program attribute, such as the date, time, channel, title, program description and genre associated with the program. If the selected set contains more than one program, an average score can be utilized, or the maximum value to any program in the selected set.

As shown in FIG. 1, the television programming recommender 100 contains a program database 200, discussed further below in conjunction with FIG. 2, and a similar program recommendation process 300, discussed further below in conjunction with FIG. 3. Generally, the program database 200 records information for each program that is available in a given time interval. The similar program recommendation process 300 computes a similarity metric between each program in a selected set and each program in an identified time interval.

The television programming recommender 100 may be embodied as any available television program recommender, such as the Tivo™ system, commercially available from Tivo, Inc., of Sunnyvale, Calif., or the television program recommenders 110 described in U.S. patent application Ser. No. 09/466,406, filed Dec. 17, 1999, entitled "Method and Apparatus for Recommending Television Programming Using Decision Trees," and U.S. patent application Ser. No. 09/498,271, filed Feb. 4, 2000, entitled "Bayesian TV Show Recommender,", as modified herein to carry out the features and functions of the present invention.

According to another feature of the present invention, the television programming recommender 100 observes the shows that are actually selected for viewing and incrementally adjusts the weightings, $w_i$, assigned to each program attribute using a feedback path 160, so that over time, the similarity metric, $S_M$, more accurately reflects the viewer's idea of "similar shows."

FIG. 2 is a sample table from the program database 200 of FIG. 1 that records information for each program that is available in a given time interval. As shown in FIG. 2, the program database 200 contains a plurality of records, such as records 205 through 220, each associated with a given program. For each program, the program database 200 indicates the date/time and channel associated with the program in fields 240 and 245, respectively. In addition, the title and genre for each program are identified in fields 250 and 255. Additional well-known attributes (not shown), such as actors, duration, and description of the program, can also be included in the program database 200.

In accordance with one feature of the present invention, the program database 200 also records an indication of the similarity metric assigned to each program by the television programming recommender 100 in field 270. In this manner, the numerical similarity scores can be displayed to the viewer in the electronic program guide with each program. In a further variation, the similarity metric can be mapped onto a color spectrum or another visual cue that permits the viewer to quickly locate programs of interest. In further variations, the electronic program guide can be sorted in accordance with the numerical similarity scores, such that the most similar programs appear on the top of the sorted list.

Figure 3:
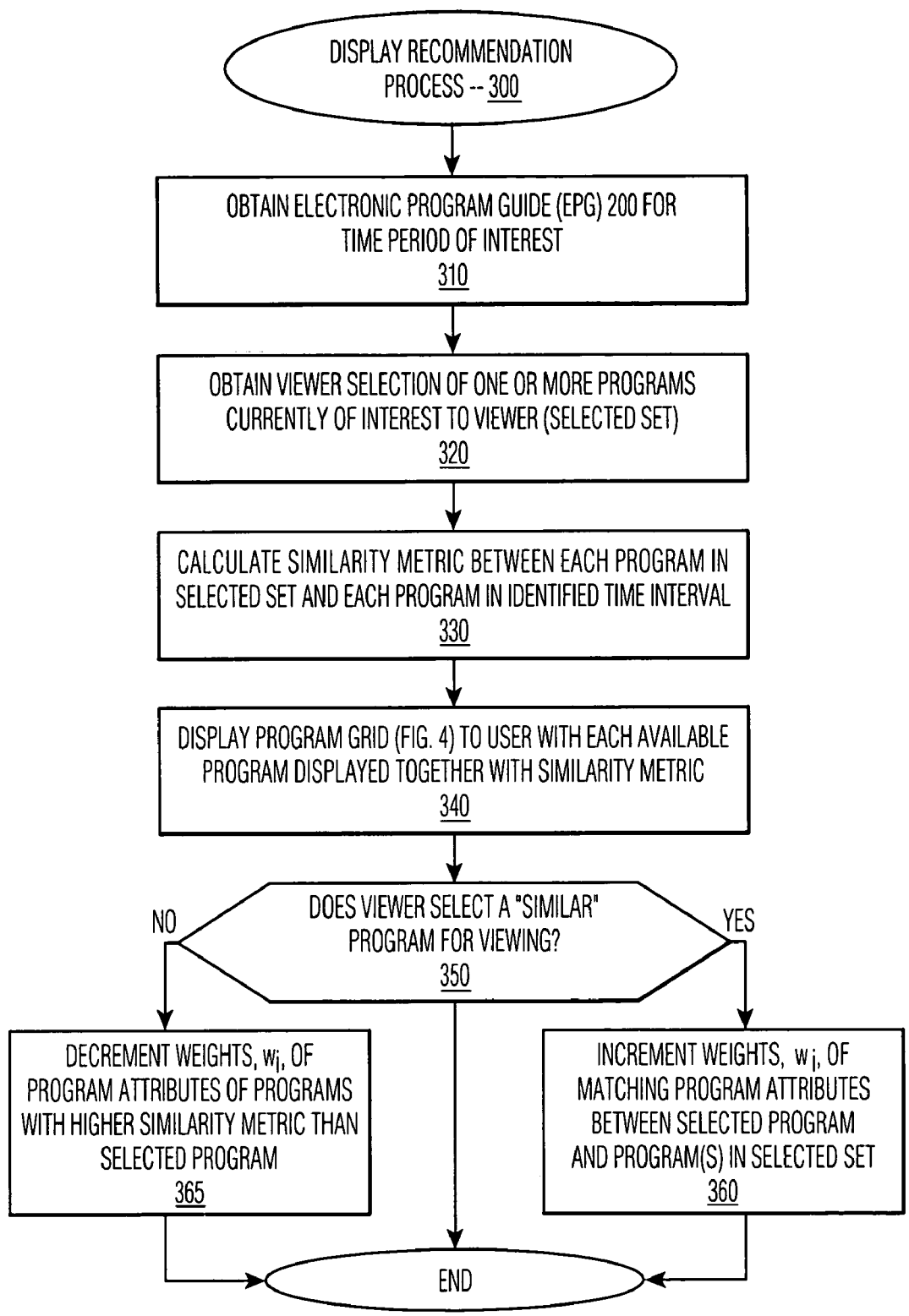
FIG. 3 is a flow chart describing an exemplary similar program recommendation process embodying principles of the present invention.

FIG. 3 is a flow chart describing an exemplary similar program recommendation process 300 embodying principles of the present invention. As shown in FIG. 3, the similar program recommendation process 300 initially obtains the electronic program guide (EPG) 110 during step 310 for the time period of interest. Thereafter, the similar program recommendation process 300 obtains a viewer selection of one or more programs currently of interest to the viewer during step 320.

The set of one or more programs currently of interest to the viewer is referred to as the selected set. The viewer may enter the selected set, for example, by selecting one or more programs in the electronic program guide 110 or in a listing of programs from the viewer's viewing history (not shown). In addition, the viewer may request the television programming recommender 100 to generate a list of programs that are similar to a program currently being watched by the viewer.

Thereafter, the similar program recommendation process 300 calculates a similarity metric during step 330 between each program in the selected set and each program in an identified time interval. The identified time interval may be, for example, a default time window following the current time, or the next "prime time" interval, such as the hours between 8 p.m. and 11 p.m.

In one illustrative embodiment, the similarity metric, $S_M$, between one program, j, and each program, k, in an identified time interval is a sum of weighted scores for each matching program attribute, as follows:

$$S_M(k, j) = \sum_{i=1}^{N-\text{matching\_features}(k,j)} w_i \tag{1}$$

The following exemplary weights, $w_i$, can be used with equation (1):

| PROGRAM ATTRIBUTE | WEIGHT |
|---|---|
| Daytime | 2 |
| Station | 1 |
| Genre | 10 |
| Title | 100 |
| Actor | 15 |
| Description Terms (each score) | 5 |
| Director | 12 |
| Producer | 6 |
| Executive Producer | 6 |
| Writer | 12 |
| Host | 12 |

The similarity metric, $S_M{}^t$, between a set of programs and each program in an identified time interval is an average of the similarity metrics, $S_M$, for each program in the set, as follows:

$$S_M(k) = \frac{1}{NUMB.\_SHOWS\_IN\_SET} \sum_{J=1}^{NUMB.\_SHOWS\_IN\_SET} S_M(k, j) \tag{2}$$

In a further variation, the similarity metric is computed as a maximum of the similarity metrics, $S_M$, for each program in the set, as follows:

$$S_M(k)=\max\{S_M(k,1), S_M(k,2) \ldots S_M(k,\text{NUMB\_SHOWS\_IN\_SET})\} \quad (3)$$

The television programming recommender 100 can be initiated with a default similarity metric with feature-weightings, $w_i$, in equations 1 and 2, that are known to be reasonable for average viewers.

As shown in FIG. 3, during step 340, the similar program recommendation process 300 displays the program grid 400, discussed below in conjunction with FIG. 4, indicating each program in the identified time interval together with the calculated similarity metric, $S_M$. Alternatively, the television programming recommender 100 can generate a top-N list of the programs having the N highest similarity metrics. The user can thereafter interact with the modified program grid using known techniques, for example, to select programs, automatically record programs or to program warnings that will automatically notify the user when a particular program is being presented.

The similar program recommendation process 300 performs a test during step 350 to determine if the viewer selects one of the recommended "similar" shows. For example, the test performed during step 350 might determine if the viewer selected one of the top N programs having the highest similarity metric. If it is determined during step 350 that the viewer selects one of the recommended "similar" shows, then the weightings, $w_i$, for each matching program attribute between the selected show and the program(s) initially specified by the viewer are incremented during step 360.

If, however, it is determined during step 350 that the viewer does not select the top recommended "similar" show, then the weightings, $w_i$, for each matching program attribute between each "similar" program having a higher similarity metric than the selected program and the program(s) initially specified by the viewer are decremented during step 365. It is noted that the amount by which the weights are adjusted during steps 360 and 365 are generally small, to avoid instabilities (thrashing). In this manner, the television programming recommender 100 can observe over time which similar shows are actually selected for viewing and incrementally adjust the weightings, $w_i$, so that over time, the similarity metric, $S_M$, more accurately reflects the viewer's idea of "similar shows."

In one preferred implementation, the weights are not dynamically adjusted during steps 360 or 365 if the viewer selects the top-rated similar show, or selects nothing (since there is no indication that the similarity metric is wrong). If the viewer selects a show that is not the top-rated similar show, then the weights are dynamically adjusted as described above.

FIG. 4 is a sample table from the electronic program guide 400 in accordance with an embodiment of the invention. Specifically, the embodiment of FIG. 4 presents each program together with the similarity metric. Thus, a user can review the electronic program guide 400 and quickly identify the programs having the highest score.

As previously indicated, a further variation of the invention allows the television channels to be sorted in the program grid according to a normalized similarity metric for the time period being examined. For example, for a given half-hour time interval, the program grid can be sorted directly by similarity metric, such that programs with the highest similarity metric appear on the top of the program grid listing. Likewise, for time intervals larger than a half hour, a normalized score can be assigned to each channel for the time period of interest and the program grid can then be sorted by the normalized score, such that channels with the highest normalized score for the time period of interest appear on the top of the program grid listing.

In one illustrative implementation, a normalized score for a channel can be computed in the following manner. First, the similarity metrics, $s_1, s_2, \ldots, s_n$ (where $0 \leq s_i \leq 100$) of all the shows to be shown on the channel in a given time period are obtained. Thereafter, each similarity metric $s_i$ is adjusted by a weighting factor $w_i$. The normalized score for the channel is the sum of these adjusted weights $w_1 * s_1 + w_2 * s_2 + \ldots + w_n * s_n$. The weighting factor can be found as follows. If $s_i$ is >95, then $w_i=100$; if $s_i$ is less than 95 but greater than 50, then $w_i=10$. If $s_i$ is less than or equal to 50, then $w_i=1$. The effect is to give a heavy weight to highly similar shows and a smaller weight to not so highly similar shows (and unit weight to neutral and not recommended shows). Channels with more recommended shows will get higher normalized scores. Of course, variations on this normalization scheme exist, as would be readily apparent to one of ordinary skill in the art. In a weighted implementation, the weight may be proportional to the length of a program. In this manner, a similar one hour show would not be equal to two half-hour shows having the same combined similarity metric, $S_M$, as the longer program.

It is to be understood that the embodiments and variations shown and described herein are merely illustrative of the principles of this invention and that various modifications may be implemented by those skilled in the art without departing from the scope and spirit of the invention.

What is claimed is:

1. A method comprising:
   obtaining a list of available programs on a plurality of channels during a given time period,
   obtaining a selection of selected programs that are of current interest to a user,
   determining a measure of similarity between each of the available programs and the selected programs,
   determining a score for each channel of the plurality of channels, based on the measures of similarity of the available programs on the channel during the given time period, and
   displaying the available programs on a plurality of selected channels based on the score of each channel.

2. The method of claim 1, wherein displaying the available programs includes displaying the available programs for each of the selected channels in an order based on the score of each channel.

3. The method of claim 2, wherein determining the score includes assigning a normalized score to each channel based on a weighting factor applied to the measure of similarity of each available program on the channel during the given time period.

4. The method of claim 3, wherein the weighting factor is dependent upon a length of each available program on the channel.

5. The method of claim 4, wherein the weighting factor is dependent upon the measure of similarity such that available programs with high measures of similarity are weighted higher than available programs with low measures of similarity.

6. The method of claim 2, wherein the weighting factor is dependent upon the measure of similarity such that available programs with high measures of similarity are weighted higher than available programs with low measures of similarity.

7. The method of claim 1, wherein determining the score includes assigning a normalized score to each channel based on a weighting factor applied to the measure of similarity of each available program on the channel during the given time period.

8. The method of claim 7, wherein the weighting factor is dependent upon a length of each available program on the channel.

9. The method of claim 8, wherein the weighting factor is dependent upon the measure of similarity such that available programs with high measures of similarity are weighted higher than available programs with low measures of similarity.

10. The method of claim 7, wherein the weighting factor is dependent upon the measure of similarity such that available programs with high measures of similarity are weighted higher than available programs with low measures of similarity.

11. The method of claim 1, wherein the selected programs are selected from one or more of the list of available programs and a viewing history of the user.

12. The method of claim 1, including adjusting weights associated with attributes used in determining the measure of similarity, based on corresponding attributes of one or more programs that are selected for viewing during the given time period.

13. The method of claim 1, wherein determining the measure of similarity is based on a weighted combination of similarity scores associated with attributes of the selected programs.

14. The method of claim 13, including adjusting one or more weights used in the weighted combination based on corresponding attributes of a program selected for viewing by the user.

15. A system comprising:
   a memory for storing computer readable code; and
   a processor operatively coupled to the memory that, upon executing the computer readable code, is configured to:
      obtain a list of available programs on a plurality of channels during a given time period,
      obtain a selection of selected programs that are of current interest to a user,
      determine a measure of similarity between each of the available programs and the selected programs,
      determine a score for each channel of the plurality of channels, based on the measures of similarity of the available programs on the channel during the given time period, and
      display the available programs on a plurality of selected channels based on the score of each channel.

16. The system of claim 15, wherein the processor is configured to display the available programs in an ordered form based on the score of each channel.

17. The system of claim 15, wherein the processor is configured to determine the score by assigning a normalized score to each channel based on a weighting factor applied to the measure of similarity of each available program on the channel during the given time period.

18. The method of claim 17, wherein the weighting factor is dependent upon a length of each available program on the channel.

19. A computer-readable medium that includes a program that enables a processor to:
   obtain a list of available programs on a plurality of channels during a given time period,
   obtain a selection of selected programs that are of current interest to a user,
   determine a measure of similarity between each of the available programs and the selected programs,
   determine a score for each channel of the plurality of channels, based on the measures of similarity of the available programs on the channel during the given time period, and
   display the available programs on a plurality of selected channels based on the score of each channel.

20. The medium of claim 19, wherein the processor is configured to determine the score by assigning a normalized score to each channel based on a weighting factor applied to the measure of similarity of each available program on the channel during the given time period.

* * * * *